United States Patent [19]
Suita et al.

[11] Patent Number: 5,183,612
[45] Date of Patent: Feb. 2, 1993

[54] PROCESS AND APPARATUS FOR MANUFACTURING FRAME WITH GROOVE FOR USE WITH PANEL

[75] Inventors: Yoshihiro Suita; Tosikazu Ito, both of Obu, Japan

[73] Assignee: Tokai Kogyo Kabushiki Kaisha, Aichi, Japan

[21] Appl. No.: 820,247

[22] Filed: Jan. 14, 1992

[30] Foreign Application Priority Data

Jan. 14, 1991 [JP] Japan ................... 3-014770

[51] Int. Cl.$^5$ ...................... B29C 41/24; B29C 41/44; B29C 47/08
[52] U.S. Cl. .................... 264/145; 264/149; 264/157; 264/177.1; 264/177.17; 264/334; 425/113; 425/127; 425/308; 425/376.1
[58] Field of Search ............... 264/138, 145, 149, 166, 264/177.1, 252, 254, 177.17, 209.2, 334, 157; 425/113, 127, 308, 376.1

[56] References Cited

U.S. PATENT DOCUMENTS

| | | | |
|---|---|---|---|
| 4,584,150 | 9/1986 | Ballocca | 425/135 |
| 4,983,113 | 1/1991 | Hirschkorn | 425/183 |
| 5,057,265 | 10/1991 | Kuhert et al. | 264/161 |
| 5,108,526 | 4/1992 | Cornils et al. | 264/177.1 |

Primary Examiner—Willard Hoag
Attorney, Agent, or Firm—Dennison, Meserole, Pollack & Scheiner

[57] ABSTRACT

A process and apparatus for manufacturing a frame with a groove such as a molding for use with a panel such as a windshield of an automobile. The process includes the steps of preparing a dummy panel having an outer configuration and a thickness equal to those of the panel, and continuously moving an extrusion port of a molding die means along the peripheral edge of the dummy panel so that a molding product is continuously formed along the peripheral edge of the dummy panel. The molding product is stripped from the peripheral edge of the dummy panel to obtain the frame with a groove. The groove is closely engageable with the peripheral edge of the panel. The apparatus includes a dummy panel having an outer configuration and a thickness equal to those of the panel, molding die means having an extrusion port, and moving means for moving the extrusion port of the molding die means relative to the peripheral edge of the dummy panel.

7 Claims, 9 Drawing Sheets

PROCESS AND APPARATUS FOR MANUFACTURING FRAME WITH GROOVE FOR USE WITH PANEL

BACKGROUND OF THE INVENTION

The present invention relates to a process and apparatus for manufacturing a frame with a groove for use with a panel such as a windshield of an automobile.

It is known that a frame with a groove to be mounted on a panel such as a windshield of an automobile is linearly molded and then mounted on the peripheral edge of the panel. The frame is molded by extruding synthetic resin, rubber or the like.

The linearly molded frame has to be bent at each corner portion of the panel when it is mounted on the peripheral edge of the panel. Therefore, in such a conventional frame, there is a possibility of wrinkling and floating of the frame at each corner portion of the panel or in the vicinity thereof. This may lead to awkward appearance of the frame.

It is understood that a frame configured to conform to the outer configuration of the panel can be used to effectively eliminate the problem associated with the linearly molded frame.

SUMMARY OF THE INVENTION

It is an object of the present invention to provide a process and apparatus for manufacturing a frame with a groove easily at low costs.

According to the present invention, there is provided a process for manufacturing a frame with a groove which comprises the steps of preparing a dummy panel having an outer configuration and a thickness equal to those of the panel; providing molding die means having an extrusion port for extruding a molding material to form a molding product; engaging a part of the peripheral edge of the dummy panel into the extrusion port of the molding die means; continuously extruding the molding material from the extrusion port of the molding die means; continuously moving the extrusion port of the molding die means along the peripheral edge of the dummy panel by providing three-dimensional relative movement between the molding die means and the dummy panel so that the molding product is continuously formed over the entire length of the peripheral edge of the dummy panel; and stripping the molding product from the peripheral edge of the dummy panel to obtain the frame with a groove. The groove is closely engageable with the peripheral edge of the panel.

According to the present invention, there is provided apparatus for manufacturing a frame with a groove which comprise a dummy panel having an outer configuration and a thickness equal to those of the panel; retaining means for retaining the dummy panel thereon; molding die means positioned adjacent to the retaining means and having an extrusion port for extruding a molding material, the extrusion port being engageable with the peripheral edge of the dummy panel retained by the retaining means to form a molding product therealong; and moving means connected to the molding die means or the retaining means for three-dimensionally moving the molding die means relative to the dummy panel retained on the retaining means.

An important feature of the present invention is that the process and apparatus may provide a frame with a groove which is configured to conform to the outer configuration of a panel.

The present invention will become more fully apparent from the claims and the description as it proceeds in connection with the drawings.

DETAILED DESCRIPTION OF THE PREFERRED EMBODIMENT

A frame with a groove according to a preferred embodiment of the present invention will now be described with reference to FIGS. 1 to 4. In the preferred embodiment, the frame with a groove is constructed as a molding with a groove (hereinafter referred to simply as a molding and labeled with numeral 3) which is adaptable to a rear windshield 2 of an automobile. The windshield 2 is generally formed of a curved glass.

Figure 1:
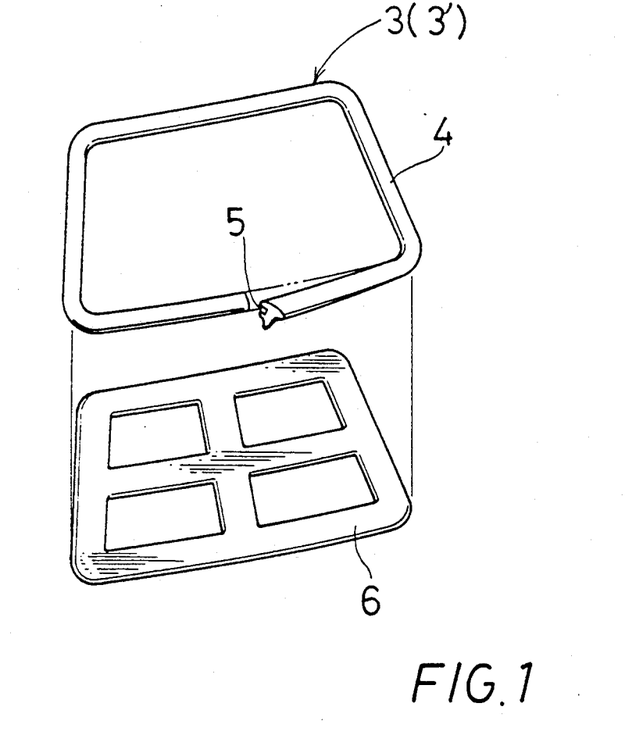
FIG. 1 is an elevational view of a frame of the present invention.
Figure 2:
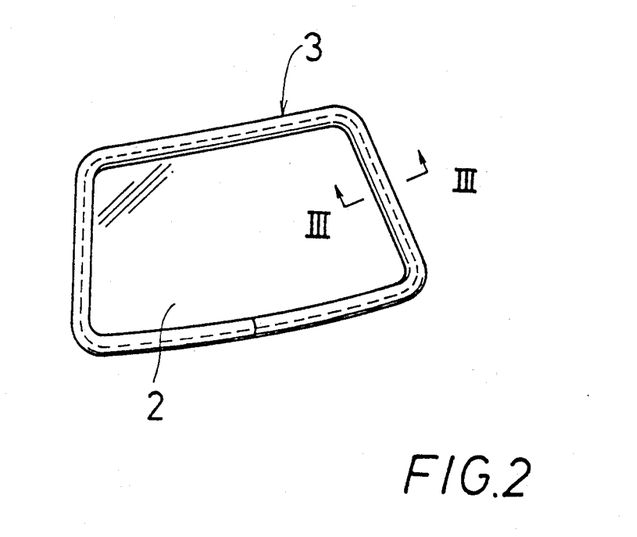
FIG. 2 is an elevational view of a windshield with the frame.
Figure 3:
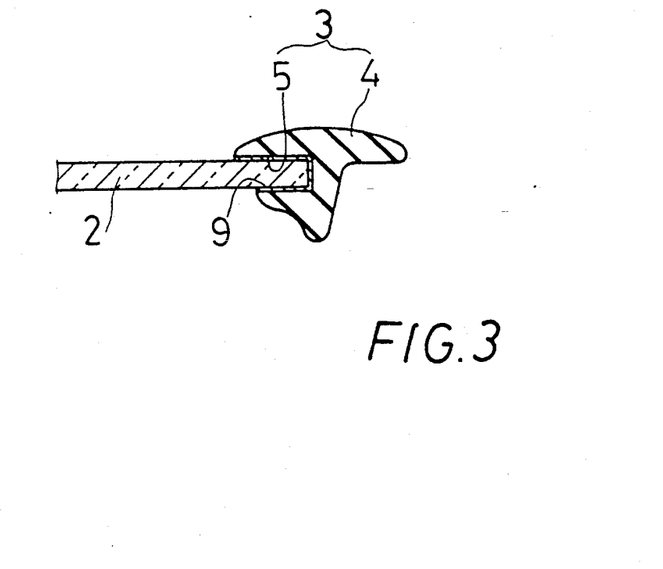
FIG. 3 is a sectional view taken along the line III—III in FIG. 2.
Figure 4:
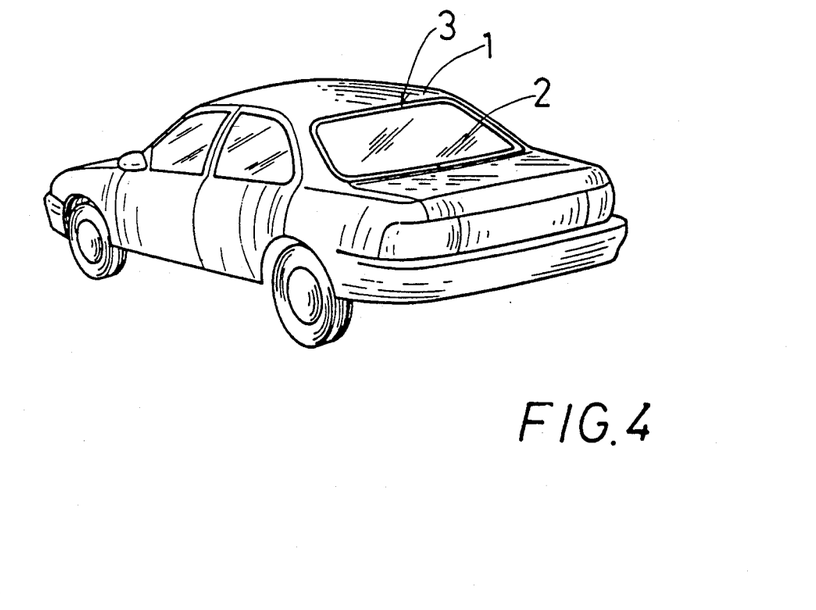
FIG. 4 is a schematic perspective view of an automobile having the windshield with the frame.

As shown in FIGS. 1 to 3, the molding 3 comprises a molding body 4 having a groove 5 into which the peripheral edge of the windshield 2 is to be received. The molding 3 is formed by extruding synthetic resin, rubber or the like and is configured to conform to the outer configuration of the windshield 2.

As shown in FIG. 1, the molding 3 is manufactured by continuously extruding molding material such as rubber along the peripheral edge of a dummy windshield 6 to form a molding product 3' and subsequently stripping the molding product 3' therefrom. The dummy windshield 6 has an outer configuration and a thickness equal to those of the windshield 2. The molding 3 thus formed has a configuration conforming to the outer configuration of the windshield 2 and comprises the molding body 4 having the groove 5 which can receive the peripheral edge of the windshield 2. Therefore, the molding 3 can be easily manufactured only by stripping the molding product 3' from the dummy windshield 6.

As shown in FIGS. 2 and 3, the molding 3 is mounted on the windshield 2 by engaging the groove 5 with the peripheral edge of the windshield 2 and is bonded thereon by adhesive 9. As described above, since the molding 3 is previously formed so as to conform to the outer configuration of the windshield 2, the molding 3 is fittingly and closely mounted on the windshield 2 without producing wrinkling and floating at each corner portion of the windshield 2.

A preferred embodiment of manufacturing apparatus according to the present invention will now be described with reference to FIGS. 5 to 9.

Figure 5:
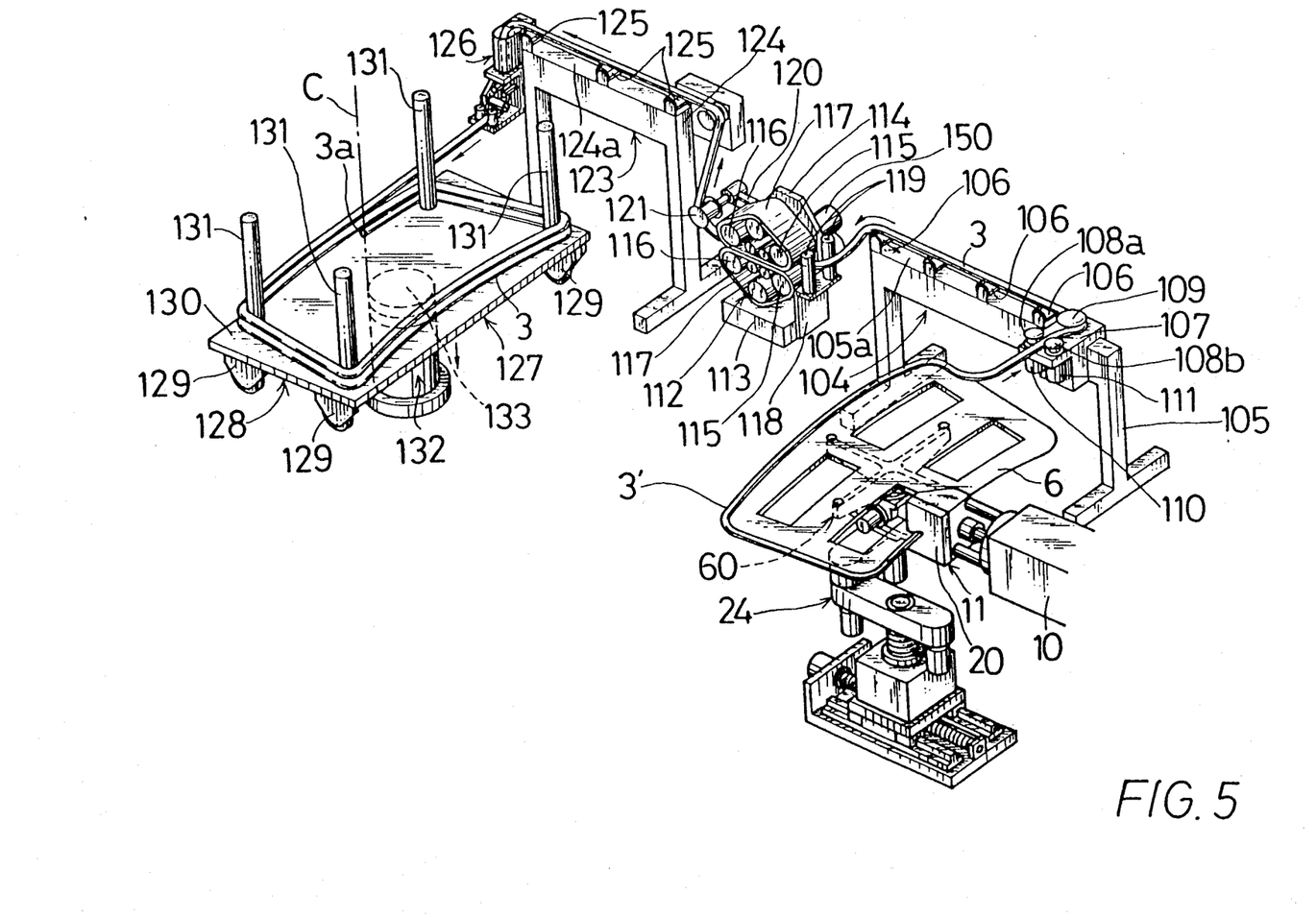
FIG. 5 is a perspective view of apparatus for manufacturing the frame according to the present invention.

As shown in FIG. 5, the manufacturing apparatus generally comprises a dummy windshield 6, a die unit 11, a dummy windshield retaining member 60 for retaining the dummy windshield 6, a moving unit 24 for moving the dummy windshield 6 retained by the retaining member 60, a first guide unit 104, a pulling machine 112, a second guide unit 123, and a winder 127.

Figure 6:
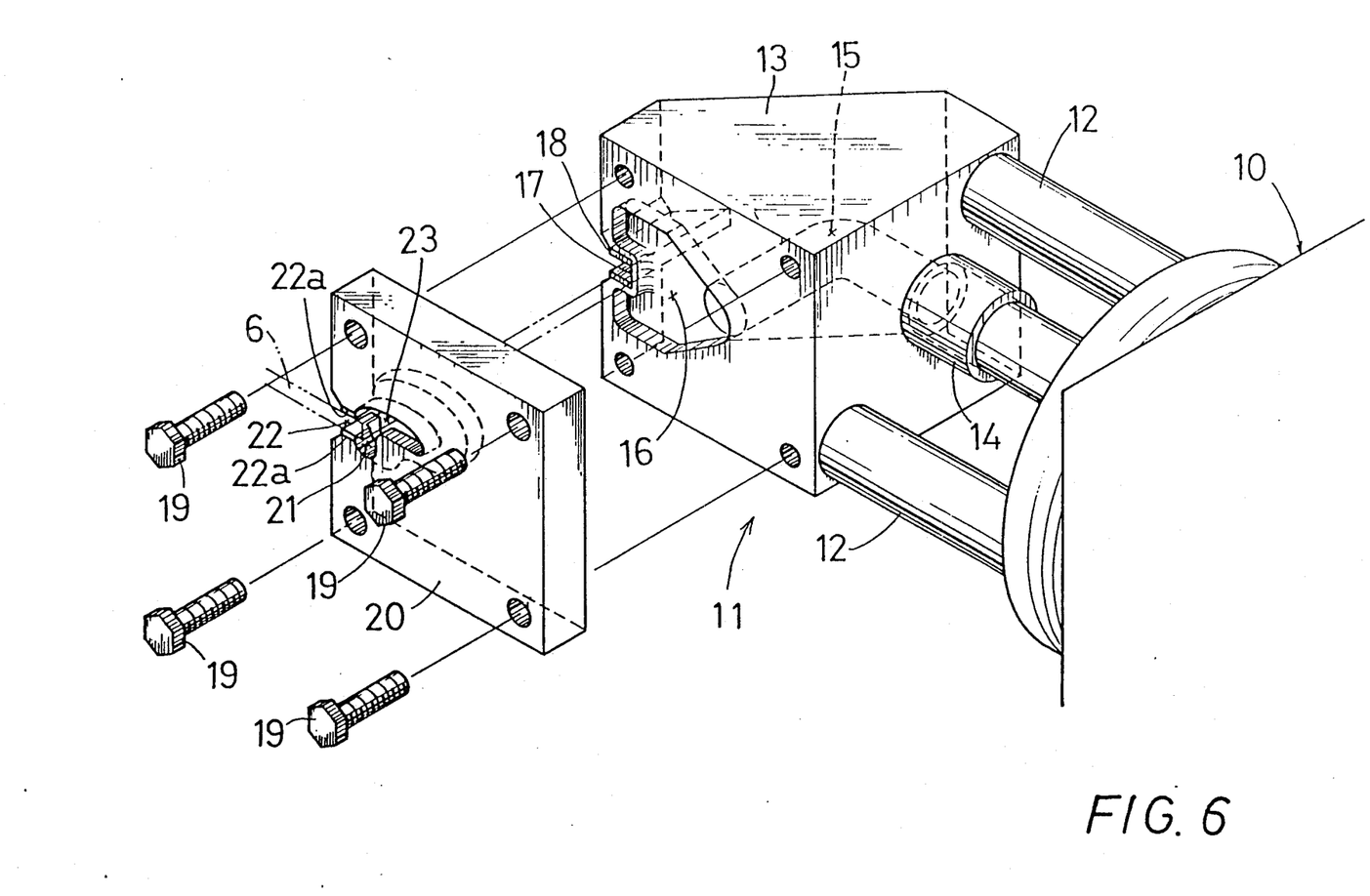
FIG. 6 is an exploded perspective view of a die unit shown in FIG. 5.

As shown in FIG. 6, the die unit 11 includes a die body 13 connected through a plurality of fixing bars 12 to the front end of the extruder 10. The die body 13 has a molding material supplying passage 15 of which one end communicates through a joint pipe 14 with a molding material extruding passage (not shown) formed in the extruder 10 and of which the other end opens to an outlet 16 recessed on a front end surface of the die body 13.

A U-shaped guide groove 17 is formed on a side surface of the die body 13 to engage the peripheral edge of the dummy windshield 6. A pair of protection members 18 are bonded to upper and lower surfaces of the guide groove 17. Each of the protection members 18 is made of a rubber material having an elastic compressibility.

A mouthpiece 20 is detachably mounted on the front end surface of the die body 13 by a plurality of bolts 19. The mouthpiece 20 is formed with an extrusion port 21 communicating with the outlet 16 of the molding material supplying passage 15. The mouthpiece 20 is further formed with a side opening 22 communicating with the extrusion port 21 for receiving the peripheral edge of the dummy windshield 6. Protection members 22a are bonded to upper and lower surfaces of the side opening 22. Each of the protection members 22a is formed of a rubber material having an elastic compressibility. A molding space 23 corresponding to the cross section of the molding 3 is defined by the peripheral edge of the dummy windshield 6 and the inner peripheral surface of the extrusion port 21 when the peripheral edge of the dummy windshield 6 is inserted through the side opening 22 into the extrusion port 21.

Figure 7:
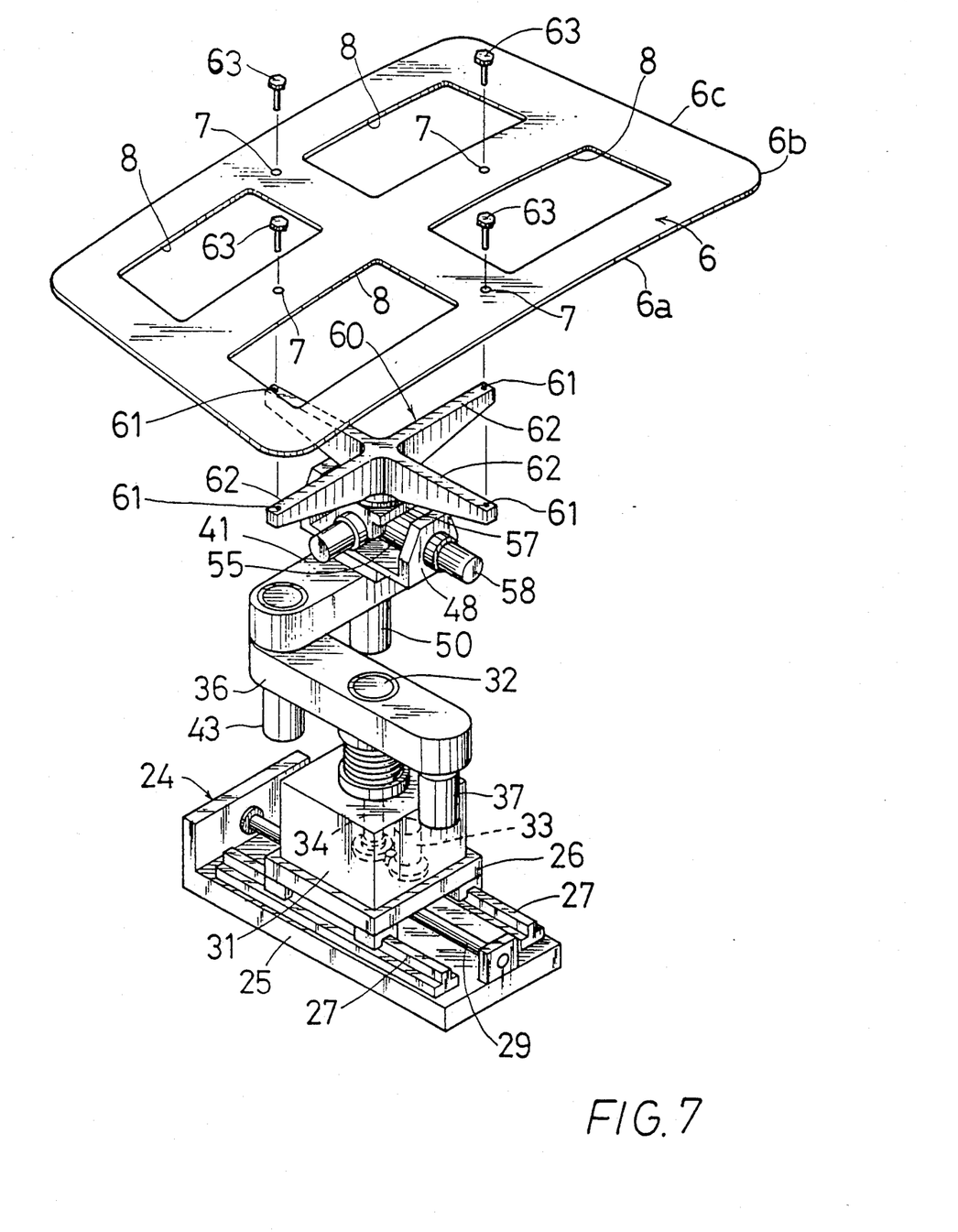
FIG. 7 is a perspective view of an assembly of a panel retaining unit and a panel moving unit shown in FIG. 5.
Figure 8:
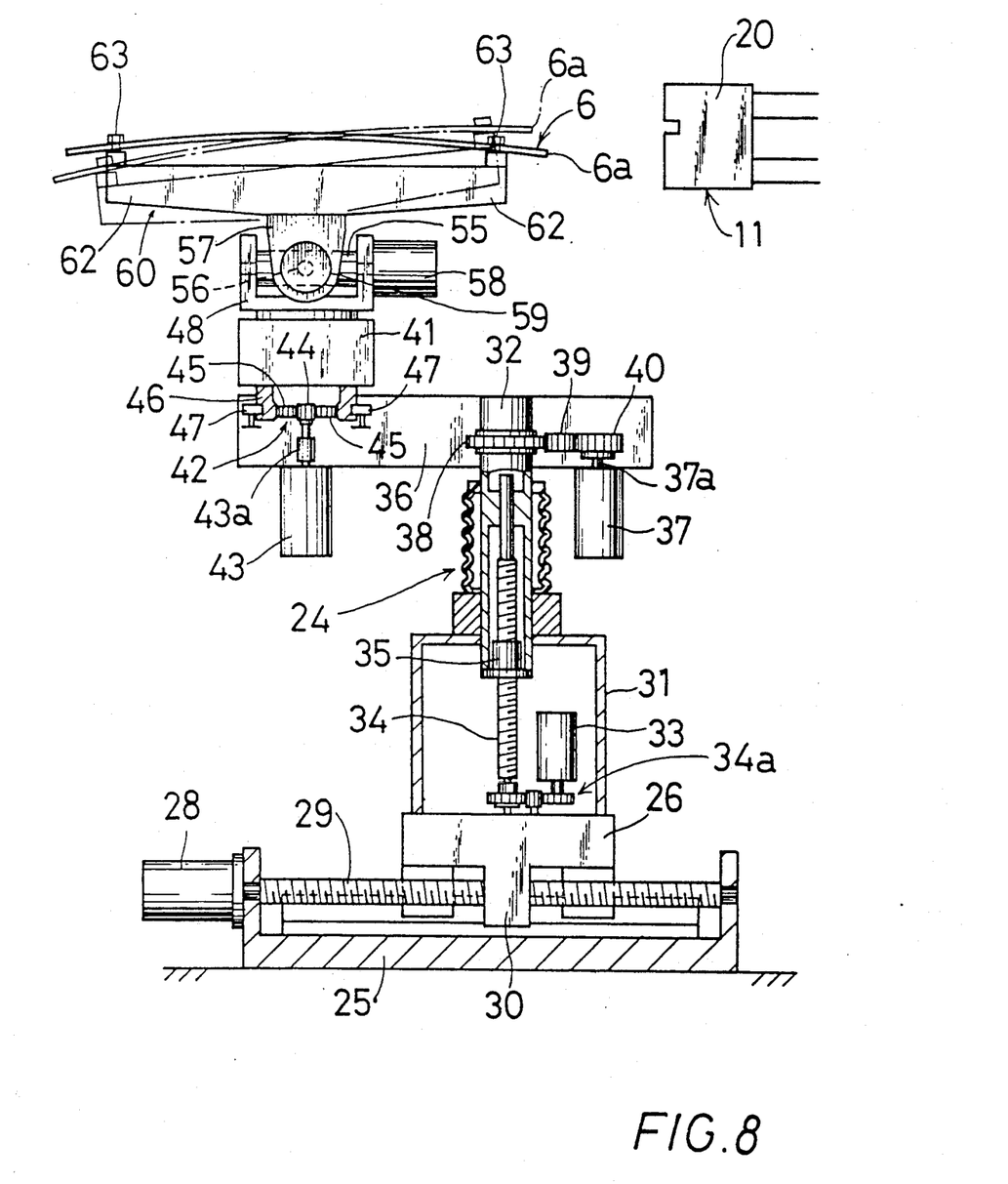
FIG. 8 is a sectional side view illustrating a driving mechanism for the panel moving unit.
Figure 9:
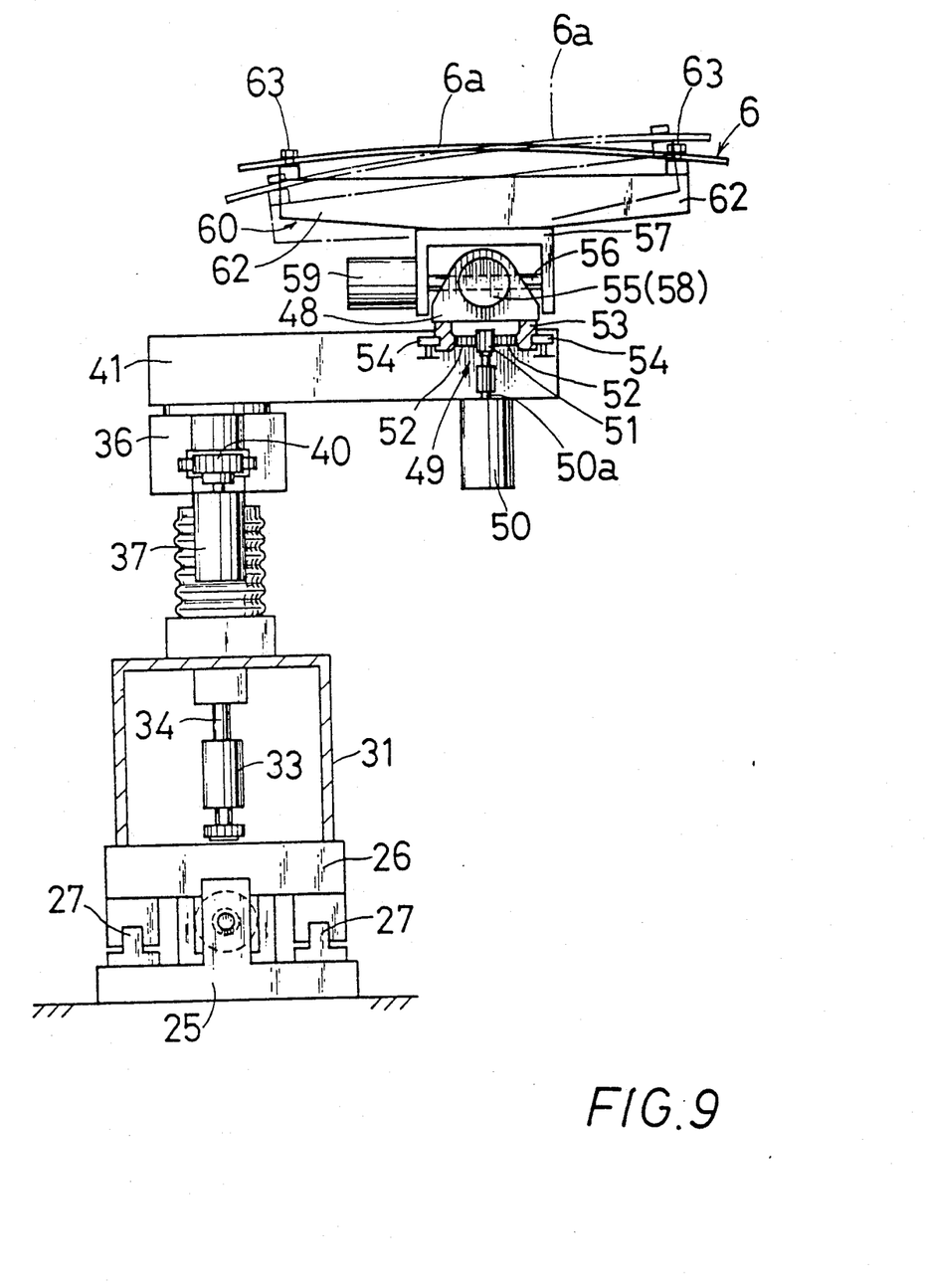
FIG. 9 is a sectional front view illustrating a driving mechanism for the panel moving unit.

Referring to FIGS. 7 to 9, there is shown an assembly of the dummy windshield retaining member 60 and the moving unit 24.

The moving unit 24 includes a base 25 fixedly mounted on a floor (not shown). The base 25 has a pair of rails 27 on which a slide table 26 is slidably mounted. The base also has a screw shaft 29 rotatably supported thereon. The screw shaft 29 is connected to a motor 28. As best shown in FIG. 8, a nut 30 is provided on a lower surface of the slide table 26 so as to threadedly engage the screw shaft 29. Accordingly, the slide table 26 is reciprocatingly moved along the rails 27 when the motor 28 is selectively driven to rotate the screw shaft 29.

A box-like supporting member 31 is mounted on the slide table 26. An elevating cylinder 32 is supported vertically movably but non-rotatably on an upper wall of the supporting member 31. The elevating cylinder 32 is connected to a rotatable screw shaft 34 which extends into the supporting member 31 and which is driven by a motor 33 through a gear mechanism 34a. A nut 35 is fixed to a lower end of the elevating cylinder 32 so that the screw shaft 34 is threadedly engaged therewith. Accordingly, the elevating cylinder 32 is upwardly or downwardly moved by selectively driving the motor 33 to rotate the screw shaft 34.

A first swivel arm 36 is mounted on an upper end portion of the elevating cylinder 32 so as to be vertically moved together with the elevating cylinder 32 and to be swiveled about the elevating cylinder 32. A fixed gear 38 is formed on an outer circumferential surface of the upper end portion of the elevating cylinder 32. A drive gear 40 is provided in the first swivel arm 36 so as to mesh with the fixed gear 38 through an intermediate gear 39. The drive gear 40 is mounted on an output shaft 37a of a motor 37 so as to be rotated together with the output shaft 37a. Accordingly, the first swivel arm 36 is swiveled about the elevating cylinder 32 by selectively driving the motor 37 to rotate the drive gear 40.

A second swivel arm 41 is provided over an upper surface of the first swivel arm 36 at a forward end portion thereof (left end portion in FIG. 8) so as to be swiveled at its base end portion (left end portion in FIG. 9) by a planetary gear mechanism 42 provided on the forward end portion of the first swivel arm 36. The gear mechanism 42 includes a sun gear 44 rotating together with an output shaft 43a of a motor 43 and a plurality of planetary gears 45 meshing with the sun gear 44. On the other hand, an outer ring gear 46 meshing with the planetary gears 45 is provided on a lower surface of the base end portion of the second swivel arm 41. The outer ring gear 46 is guided by a plurality of guide rollers 47 rotatably supported in the forward end portion of the first swivel arm 36. Accordingly, the second swivel arm 41 is swiveled about the sun gear 44 by selectively driving the motor 43 to rotate the sun gear 44.

As shown in FIG. 9, a rotating member 48 is provided over an upper surface of the second swivel arm 41 at a forward end portion thereof (right end portion in FIG. 9) so as to be rotated by a planetary gear mechanism 49 provided on the forward end portion of the second swivel arm 41. The gear mechanism 49 includes a sun gear 51 rotating together with an output shaft 50a of a motor 50 and a plurality of planetary gears 52 meshing with the sun gear 51. On the other hand, an outer ring gear 53 meshing with the planetary gears 52 is provided on a lower surface of the rotating member 48. The outer ring gear 53 is guided by a plurality of guide rollers 54 rotatably supported on the forward end portion of the second swivel arm 41. Accordingly, the rotating member 48 is rotated about the sun gear 51 by selectively driving the motor 50 to rotate the sun gear 51.

A tilting member 57 is supported on the rotating member 48 through first and second shafts 55 and 56 crossing each other. As shown in FIG. 8, the first shaft 55 is rotatably supported by a pair of bearings (not shown) on opposite side walls of the rotating member 48, and one end of the first shaft 55 is directly connected to an output shaft (not shown) of a motor 58 mounted on an outer surface of one of the opposite side walls of the rotating member 48.

As shown in FIG. 9, the second shaft 56 extends through the first shaft 55 in orthogonal relationship and is fixed thereto. The second shaft 56 is rotatably supported by a pair of bearings (not shown) on opposite side walls of the tilting member 57, and one end of the second shaft 56 is directly connected to an output shaft (not shown) of a motor 59 mounted on an outer surface of one of the opposite side walls of the tilting member 57.

Accordingly, the tilting member 57 is tilted in a clockwise or counterclockwise direction in FIG. 9 by selectively driving the motor 58 to rotate the first shaft 55. Further, the tilting member 57 is tilted in a clockwise or counterclockwise direction in FIG. 8 by selectively driving the motor 59 to rotate the tilting member 57 around the second shaft 56.

As shown in FIGS. 7 to 9, the dummy windshield retaining member 60 is fixedly mounted on an upper surface of the tilting member 57. The retaining member 60 generally has four orthogonal arms 62 each of which has a threaded bore 61 at the distal end thereof.

As best shown in FIG. 7, the dummy windshield 6 is formed of a metal plate having a thickness equal to the windshield 2 and is configured to conform to the outer configuration of the windshield 2. The dummy windshield 6 is formed with four removed portions 8 to reduce the weight thereof and is formed with four apertures 7 through which screws 63 are inserted. The apertures 7 is arranged so as to align the threaded bores 61 of the retaining member 60. The dummy windshield 6 is removably mounted on the retaining member 60 by advancing the screws 63 into the threaded bores 61.

Referring to FIG. 5, there is shown the first guide unit 104 to guide the moldings 3 which are formed by successively stripping the molding products 3' from the peripheral edge of the dummy windshield 6, the pulling machine 112 to pull and forward the moldings 3, the second guide unit 123 to guide the moldings 3 continuously forwarded by the pulling machine 112, and the winder 127 to wind the moldings 3 guided by the second guide unit 123.

The first guide unit 104 mainly comprises a base frame 105 positioned on the floor and having a longitudinal flat upper surface 105a, a plurality of carrier rollers 106 rotatably mounted on the upper surface 105a at desired intervals, a supporting member 107 mounted on one end portion of the upper surface 105a, a pair of drive rollers 108a and 108b mounted on the supporting member 107 and a guide roller 109 mounted on the supporting member 107. The drive rollers 108a and 108b are spaced so as to receive the moldings 3 therebetween and are connected to motors 110 and 111, respectively.

The pulling machine 112 mainly comprises a base member 113 positioned on the floor, a vertical plate 114 mounted on the base member 113, a pair of drive rollers 115 and a pair of driven rollers 116 mounted on the vertical plate 114, respectively, a pair of looped belts 117 trained around the drive roller 115 and the driven roller 116, respectively, a pair of guide rollers 119 mounted on a bracket 118 fixed to the base member 113, and a roller 121 provided on an arm member 120 pivotably mounted on the vertical plate 114. Each of the drive motors 115 is connected to a motor 150.

The second guide unit 123 mainly comprises a base frame 124 positioned on the floor and having a longitudinal flat upper surface 124a, a plurality of carrier rollers 125 rotatably mounted on the upper surface 124a at desired intervals, and a guide mechanism 126 mounted on the base frame 123. The guide mechanism 126 rotates the moldings 3 at an angle of 180 degrees and forwards the moldings 3 toward the winder 127.

The winder 127 mainly comprises a carriage 128, and a driving unit 132 to vertically move and to rotate the carriage 128. The carriage 128 includes a base plate 130 having a plurality of caster wheels 129 provided on the lower surface thereof and having four guide posts 131 mounted on the upper surface thereof. Further, these guide posts 131 are generally arranged so as to correspond to the four corners of the dummy windshield 6. The driving unit 132 has a connecting plate 133 by which the lower surface of the base plate 130 is detachably connected to the upper portion of the driving unit 132.

The process for manufacturing the moldings 3 will now be described in connection with the operation of the apparatus thus constructed.

Dummy Windshield Positioning Step

As shown in FIG. 7, the dummy windshield 6 is mounted on the retaining member 60 by advancing the screws 63 into the threaded bores 61 of the retaining member 60 so that a lower portion 6a of the dummy windshield 6 is opposed to the molding die unit 11.

As shown in FIGS. 8 and 9, the motors 58, 59 are selectively driven to tilt the tilting member 57 so that the lower portion 6a of the peripheral edge of the dummy windshield 6 mounted on the retaining member 60 is horizontally oriented at the central part thereof. Subsequently, the motor 33 is driven to upwardly or downwardly move the elevating cylinder 32 of the moving unit 24 so that the central part of the lower portion 6a of the peripheral edge of the dummy windshield 6 is level with the side opening 22 formed on the mouth piece 20 of the die unit 11.

Figures 10, 11:
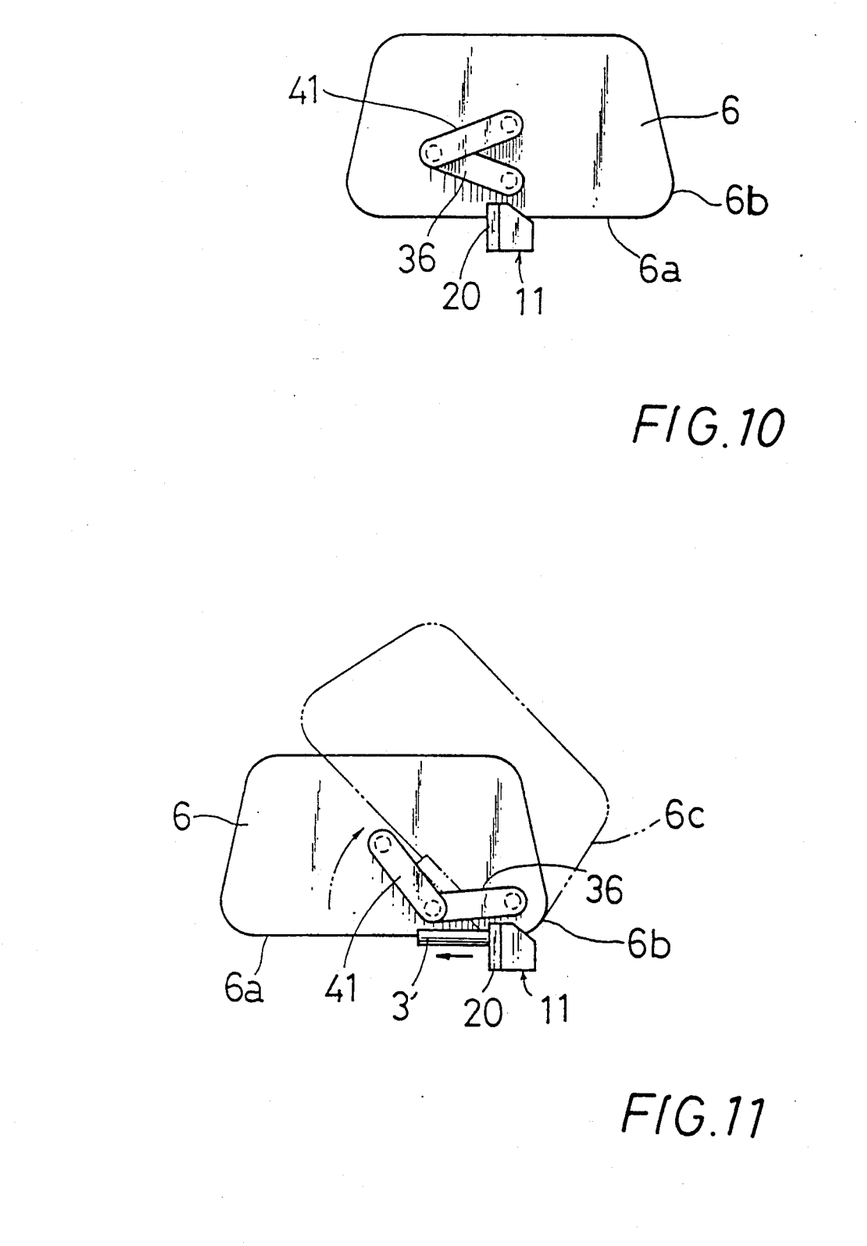
FIGS. 10, 11 and 12 are schematic plan views illustrating the operation wherein the frame is formed by extrusion molding along the peripheral edge of a dummy windshield.

Thereafter, the motor 28 is driven to rotate the screw shaft 29 for forwardly and rearwardly (leftwardly and rightwardly in FIG. 8) moving the slide table 26 until the central part of the lower portion 6a of the peripheral edge of the dummy windshield 6 is inserted into the extrusion port 21 of the mouth piece 20 from the side opening 22 at a desired depth, as shown in FIG. 10.

By the insertion of the peripheral edge of the dummy windshield 6 into the extrusion port 21 of the mouthpiece 20, the molding space 23 corresponding to the cross section of the molding 3 is defined between the peripheral edge of the dummy windshield 6 and the inner wall surface of the extrusion port 21 of the mouth piece 20.

Extrusion Molding Step

Then, a molding material is supplied from the extruder 10 to the molding material supplying passage 15 in the die unit 11 and is extruded into the molding space 23 through the extrusion port 21.

When the molding material is extruded from the extrusion port 21, the motors 37 and 43 are driven to swivel the first and second swivel arms 36 and 41 in predetermined directions, respectively. As a result, the lower portion 6a of the peripheral edge of the dummy windshield 6 is moved relative to the die means 11, with the lower portion 6a kept in the extrusion port 21 of the mouthpiece 20. Further, the motors 58 and 59 are continuously selectively driven to move the tilting member 57 so that the lower portion 6a is constantly horizontally kept at a portion engaged with the die means 11. The moving speed of the lower portion 6a of the peripheral edge of the dummy windshield 6 is set to be substantially equal to the extruding speed of the molding material. Thus, as shown in FIG. 11, the molding product 3' is continuously formed along the lower portion 6a of the peripheral edge of the dummy windshield 6 from the central part of the lower portion 6a to a first corner portion 6b.

As shown in FIG. 11, when the first corner portion 6b of the dummy windshield 6 reaches the mouthpiece 20, the motors 58 and 59 are driven to tilt the tilting member 57 so that the first corner portion 6b of the peripheral edge of the dummy windshield 6 is horizontally oriented, thereby maintaining the horizontal position of the first corner portion 6b with respect to the mouthpiece 20. Thereafter, the motor 50 is driven to rotate the rotating member 48 simultaneously with the swiveling motion of the first and second swivel arms 36 and 41, thereby moving the first corner portion 6b relative to the die means 11 as shown by a phantom line. Thus, the molding product 3' is continuously formed along the first corner portion 6b of the peripheral edge of the dummy windshield 6.

Figure 12:
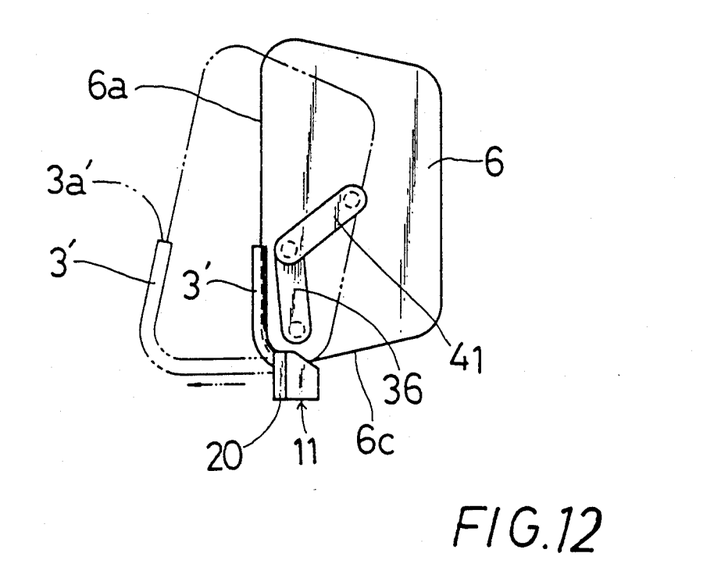
Figure 13:
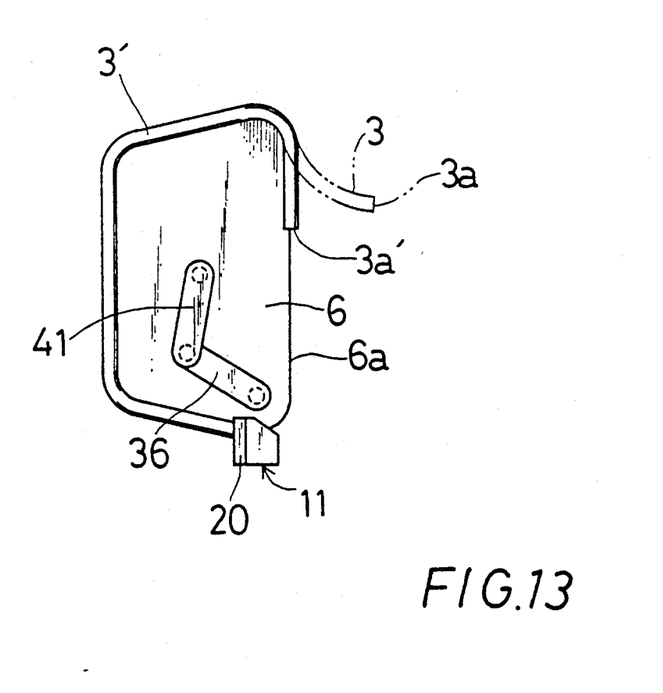
FIG. 13 is a schematic plan view illustrating the operation wherein the formed frame is stripped from the peripheral edge of the dummy windshield.

As shown in FIG. 12, when the first corner portion 6b of the dummy windshield 6 passes through the mouthpiece 20 and a right side portion 6c of the peripheral edge of the dummy windshield 6 reaches the mouthpiece 20, the motors 58 and 59 are further driven to tilt the tilting member 57 so that the right side portion 6c of the peripheral edge of the dummy windshield 6 is horizontally oriented at one end (left end in FIG. 12) thereof, thereby maintaining the horizontal position of the end of the right side portion 6c with respect to the mouthpiece 20. Thereafter, the motor 50 is further driven to rotate the rotating member 48 simultaneously with the swiveling motion of the first and second swivel arms 36 and 41, thereby moving the right side portion 6c relative to the die means 11 as shown by a phantom line. Further, the motors 58 and 59 are continuously selectively driven to move the tilting member 57 so that the right side portion 6c is constantly horizontally kept at a portion engaged with the die means 11. Thus, the molding product 3' is continuously formed along the right side portion 6c of the peripheral edge of the dummy windshield 6. In this manner, the molding product 3' is continuously formed over the entire length of the peripheral edge of the dummy windshield 6 as shown in FIG. 13.

As described above, the peripheral edge of the dummy windshield 6 is inserted in the extrusion port 21 of the mouthpiece 20 and is constantly maintained in the horizontal position by the panel moving means 24 during the formation of the molding product 3'. Furthermore, the peripheral edge of the dummy windshield 6 is moved along a predetermined orbital path and at a constant speed equal to the extruding speed of the molding material to be extruded from the extrusion port 21. Therefore, the molding product 3' has a uniform cross sectional configuration.

The extrusion molding step is continued without interruption to continuously form a plurality of molding products 3'.

Winding Up Step

When the first one of the molding products 3' is formed over the entire length of the peripheral edge of the dummy windshield 6, the molding product 3' is pulled from a forward end portion 3a' thereof at a constant speed equal to the extruding speed of the molding material so as to be stripped from the peripheral edge of the dummy windshield 6. Thus, the molding 3 is formed. The process is continuously performed to continuously form a plurality of moldings 3.

The moldings 3 are then pulled from a forward end portion 3a of the first one of the moldings 3 and are introduced between the drive rollers 108a and 108b of the first guide unit 104 and is successively conveyed toward the pulling machine 112 through the guide roller 109 and the carrier rollers 106.

Thereafter, the moldings 3 are introduced between the looped belts 117 of the pulling machine 112 and are further conveyed toward the second guide unit 123 through the roller 121.

The moldings 3 led on the second guide unit 123 are forwardly transferred by the carrier rollers 125 and enter the guide mechanism 126 where the moldings 3 are rotated at an angle of 180 degrees.

The moldings 3 forwarded from the guide mechanism 126 are introduced to the winder 127 where the forward end portion 3a of the first one of the moldings 3 is fixed on a desired position on the base plate 130 of the carriage 128 of the winder 127. At this time, the carriage 128 is moved to an uppermost position by the driving unit 132. Thereafter, the driving unit 132 is driven to rotate (counterclockwise in FIG. 5) and gradually lower the carriage 128. Thus, the moldings 3 successively fed from the guide mechanism 126 are helically wound up around the guide posts 131 so that the respective moldings 3 are stacked on the base plate 130. As will be easily understood, the four corner portions of each of the moldings 3 correspond to the four guide posts 131, respectively, when the moldings 3 are wound up around the guide posts 131.

When the moldings 3 are wound up around the guide posts 131 of the carriage 128 at a desired number of turns, the moldings 3 are cut at a desired position between the guide mechanism 126 and the winder 127. Thereafter, the carriage 128 is unloaded from the driving unit 132.

Then, the carriage 128 is loaded anew on the driving unit 132 through the connecting plate 133. Thereafter, the driving unit 132 is driven again to lift the carriage 128 to the uppermost position.

Subsequently, a new forward end portion (not shown) of the following moldings 3 is fixed on a desired position on the base plate 130 of the carriage 128. Under the condition, the molding step and the winding step are continued in the same way as described above.

In the unloaded carriage 128, the moldings 3 wound around the guide posts 131 are cut along the line C aligned with the forward end portion 3a of the first one of the moldings 3, thereby to separately form a plurality of moldings 3 corresponding to the number of turns of the moldings 3.

Although the above preferred embodiment employs the windshield 2 of an automobile as the panel and the molding 3 as the frame, the panel and the frame in the present invention are not limited to the above. For instance, the panel and the frame may be a door of an automobile and a weather strip to be provided on the door, respectively.

Further, although in the above preferred embodiment, the dummy windshield retaining member 60 is mounted on the panel moving unit 24 so as to move relative to the fixed die means 11, the die unit 11 may be connected to any moving unit (not shown) so that the die means 11 can be moved relative to the dummy windshield 6 retained by the retaining member 60.

While the invention has been described with reference to a specific embodiment, the description is illustrative and is not to be construed as limiting the scope of the invention. Various modifications and changes may occur to those skilled in the art without departing from the spirit and scope of the invention as defined by the appended claims.

What is claimed is:

1. A process for manufacturing a frame with a groove such as a molding for use with a panel such as a windshield of an automobile, comprising the steps of:

providing a dummy panel having an outer configuration and a thickness equal to those of said panel;

providing molding die means having an extrusion port for extruding a molding material to form a molding product;

engaging a part of the peripheral edge of said dummy panel into said extrusion port of said molding die means;

continuously extruding said molding material from said extrusion port of said molding die means;

continuously moving said extrusion port of said molding die means along the peripheral edge of said dummy panel by providing three-dimensional relative movement between said molding die means and said dummy panel so that said molding product is continuously formed over the entire length of the peripheral edge of said dummy panel; and stripping said molding product from the peripheral edge of said dummy panel to obtain said frame with a groove, the groove being closely engageable with the peripheral edge of said panel.

2. The process as defined in claim 1, wherein the step of continuously forming said molding product over the entire length of the peripheral edge of said dummy panel is repeated several times for continuously forming a plurality of frames in series.

3. The process as defined in claim 2 further comprising the step of helically winding up said frames so that the respective frames are successively stacked.

4. The process as defined in claim 3 further comprising the step of cutting said stacked frames along an axis of the helix of the frames to separately obtain a plurality of frames.

5. Apparatus for manufacturing a frame with a groove such as a molding for use with a panel such as a windshield of an automobile, comprising:

a dummy panel having an outer configuration and a thickness equal to those of said panel;

retaining means for retaining said dummy panel thereon;

molding die means positioned adjacent to said retaining means and having an extrusion port for extruding a molding material, said extrusion port being engageable with the peripheral edge of said dummy panel retained by said retaining means to form a molding product therealong; and moving means connected to said molding die means or said retaining means for three-dimensionally moving said molding die means relative to said dummy panel retained on said retaining means so that said extrusion port of said molding die means is continuously moved along the peripheral edge of said dummy panel retained on said retaining means.

6. The apparatus as defined in claim 5, wherein said moving means is connected to said retaining means.

7. The apparatus as defined in claim 6 further comprising winding means for winding up said molding product.

* * * * *